(12) United States Patent
Sutliff

(10) Patent No.: US 12,403,842 B1
(45) Date of Patent: Sep. 2, 2025

(54) MULTI-SPORT RACK THAT IS REVERSIBLY ATTACHABLE TO A PICKUP TRUCK BED WITH A BED SHELL, BED CAP, OR TONNEAU COVER

(71) Applicant: Russell Sutliff, Granite Bay, CA (US)

(72) Inventor: Russell Sutliff, Granite Bay, CA (US)

( * ) Notice: Subject to any disclaimer, the term of this patent is extended or adjusted under 35 U.S.C. 154(b) by 0 days.

(21) Appl. No.: 19/073,520

(22) Filed: Mar. 7, 2025

Related U.S. Application Data

(63) Continuation-in-part of application No. 18/928,045, filed on Oct. 27, 2024, now Pat. No. 12,269,432.

(51) Int. Cl.
| | | |
|---|---|---|
| *B60R 9/10* | (2006.01) | |
| *B60R 9/08* | (2006.01) | |
| *B62D 33/02* | (2006.01) | |

(52) U.S. Cl.
CPC .................. *B60R 9/08* (2013.01); *B60R 9/10* (2013.01); *B62D 33/0207* (2013.01)

(58) Field of Classification Search
CPC ................ B60R 9/08; B60R 9/10; B60R 9/12
USPC ................................ 224/924, 402, 403, 405
See application file for complete search history.

(56) References Cited

U.S. PATENT DOCUMENTS

| | | | | |
|---|---|---|---|---|
| 5,261,719 | A * | 11/1993 | Tucker | B60J 7/104 296/100.18 |
| 5,303,858 | A * | 4/1994 | Price | B60P 3/1008 224/570 |
| 5,599,053 | A * | 2/1997 | Wilson | B60R 9/00 224/403 |
| 6,340,106 | B1 * | 1/2002 | Dutton | B60R 9/00 224/403 |
| 10,040,490 | B2 * | 8/2018 | Schlaupitz | B60R 9/00 |
| 10,150,424 | B1 * | 12/2018 | Phillips | B60R 9/04 |
| 10,427,614 | B2 * | 10/2019 | Marchlewski | B60R 9/00 |
| 11,072,294 | B2 * | 7/2021 | Fehr | B60R 9/10 |
| 2018/0361944 | A1 * | 12/2018 | Marchlewski | B62D 33/0207 |
| 2023/0278654 | A1 * | 9/2023 | Ward | B60R 9/042 |
| 2024/0123912 | A1 * | 4/2024 | Wang | B60R 9/048 |
| 2024/0190356 | A1 * | 6/2024 | Wilson | B60R 9/10 |
| 2024/0326930 | A1 * | 10/2024 | Sevian | B62D 33/04 |

* cited by examiner

*Primary Examiner* — Scott T McNurlen
(74) *Attorney, Agent, or Firm* — Craig A. Simmermon

(57) ABSTRACT

A pickup truck rack or a multi-sport rack for a pickup truck that is reversibly attachable to the bed of a pickup truck that also has a bed shell, bed cap, or tonneau cover installed thereon. The multi-sport rack sets off to the side of the pickup truck bed like a saddle bag in order to provide clearance for the bed shell, bed cap, or tonneau cover. The multi-sport rack can be installed on the right side, the left side, or both sides of a pickup truck. Each multi-sport rack can hold: a bicycle, snow boards, surf boards, and/or skis. The multi-sport rack includes a base plate assembly that can be clamped onto the pickup truck bed, underneath the bed shell, bed cap, or tonneau cover in order to yield exceptionally strong and stable mounting of the multi-sport rack along with the bicycle, snow boards, surf boards, and/or skis.

2 Claims, 11 Drawing Sheets

MULTI-SPORT RACK THAT IS REVERSIBLY ATTACHABLE TO A PICKUP TRUCK BED WITH A BED SHELL, BED CAP, OR TONNEAU COVER

CROSS-REFERENCE TO RELATED APPLICATIONS

The instant application is a continuation-in-part of U.S. Application Ser. No. 18/928,045 entitled "BICYCLE RACK THAT IS REVERSIBLY ATTACHABLE TO A PICKUP TRUCK BED WITH A BED SHELL OR BED CAP" filed on Oct. 27, 2024, which is hereby incorporated by reference herein.

BACKGROUND OF THE INVENTION

1. Field of the Invention

This invention relates to a multi-sport rack for a pickup truck and specifically to a multi-sport rack that is reversibly attachable to the bed of a pickup truck that also has a bed shell, bed cap, or tonneau cover installed thereon. The multi-sport rack of this invention sets off to the side of the pickup truck bed like a saddle bag in order to provide clearance for the bed shell, bed cap, or tonneau cover. The multi-sport rack of this invention can be installed on the right side, the left side, or both sides of a pickup truck. The multi-sport rack of this invention can hold: a bicycle, snow boards, surf boards, and/or skis.

A bed shell or bed cap is defined as follows. A bed shell, also known as, a cap, canopy, topper, pap cap, truck cap, bed cap, box cap, or camper shell is a small housing or rigid canopy used as a pickup truck accessory. The housing is usually made of fiberglass or aluminum, but sometimes wood or canvas, and is mounted on top of the pickup truck's rear bed. The shell usually covers the entire bed of the pickup truck, and is large enough to be used for camping purposes. The top of the shell is usually even with or above the top of the pickup truck cab. Even though its initial purpose was use for camping, shells are now most often used for utility, storage purposes, and to protect bed cargo from the elements and theft. The year and model of the pickup truck determine the size and/or model of bed shell or bed cap that properly fits the pickup truck.

A tonneau cover is defined as follows. A tonneau cover is a cover for a pickup truck bed. A tonneau cover is a hard or soft cover that spans the back of a pickup truck to protect the load from weather elements, thieves, and/or to improve aerodynamics. Tonneau covers come in many styles that fold, retract, or tilt open, and can be locked shut. Common materials used include steel, aluminum, canvas, PVC, fiberglass, and carbon fiber. Modern hard tonneau covers open by a hinging or folding mechanism, while segmented or soft covers open by rolling back or folding back. The year and model of the pickup truck determine the size and/or model of tonneau cover that properly fits the pickup truck.

2. Description of Related Art

There are other multi-sport racks in the prior art that attach to a pickup truck with a bed shell, bed cap, or tonneau cover installed. However, there are none with a base plate assembly as shown and described here that can be clamped onto the pickup truck bed, underneath the bed shell, bed cap, or tonneau cover in order to yield exceptionally strong and stable mounting of the multi-sport rack. The special shape and design of the base plate assembly and the clamping mechanisms are exceptionally strong and rigid which allows the multi-sport rack(s) and bicycle(s), snow board(s), surf board(s), and/or skis to remain steady and free from vibrations at all times and during travel.

BRIEF SUMMARY OF THE INVENTION

It is an aspect of multi-sport rack that is reversibly attachable to a pickup truck bed with a bed shell, bed cap, or tonneau cover to be reversibly attachable to the naked bed of a pickup truck.

It is an aspect of multi-sport rack that is reversibly attachable to a pickup truck bed with a bed shell, bed cap, or tonneau cover to be reversibly attachable to the bed of a pickup truck with a bed shell, bed cap, or tonneau cover installed onto the bed of the pickup truck.

It is an aspect of multi-sport rack that is reversibly attachable to a pickup truck bed with a bed shell, bed cap, or tonneau cover to include a special base plate assembly that can be clamped underneath the bed the bed shell, bed cap, or tonneau cover and the bed of the pickup truck to yield a sturdy mount for the multi-sport rack.

It is an aspect of special base plate assembly to include a top plate, a side plate, and a bottom plate.

It is an aspect of special base plate assembly to include a base plate clamp bracket.

It is an aspect of special base plate assembly to include a base plate mounting flange.

It is an aspect of multi-sport rack that is reversibly attachable to a pickup truck bed with a bed shell, bed cap, or tonneau cover to include a T-bracket with a first and second T-bracket clamp.

It is an aspect of multi-sport rack that is reversibly attachable to a pickup truck bed with a bed shell, bed cap, or tonneau cover to include a front and rear stanchion assembly, each with a ratcheting tire clamp to attach and retain the bicycle.

It is an aspect of multi-sport rack that is reversibly attachable to a pickup truck bed with a bed shell, bed cap, or tonneau cover to include a first and second harp member that are used to retain snow boards, surf boards, and/or skis.

It is an aspect of multi-sport rack that is reversibly attachable to a pickup truck bed with a bed shell, bed cap, or tonneau cover to include a diagonal strap that is used to rigidly hold special base plate assembly to the pickup truck bed.

It is an aspect of multi-sport rack that is reversibly attachable to a pickup truck bed with a bed shell, bed cap, or tonneau cover to include board and ski webbing that are used to retain snow boards, surf boards, and/or skis.

DEFINITION LIST

Figure 1:
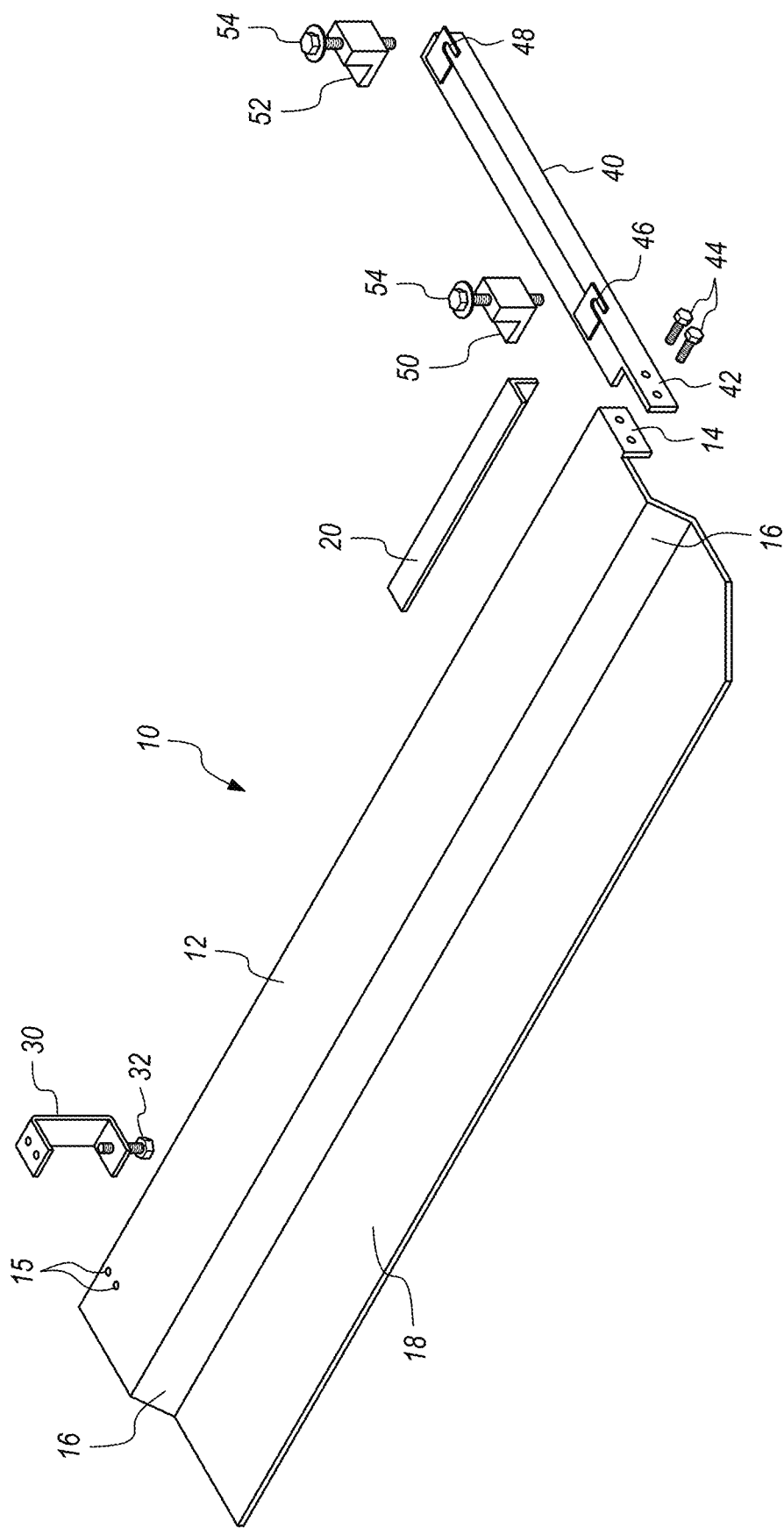
FIG. 1 is an assembly view of base plate assembly, T-bracket, base plate clamp bracket, first T-bracket clamp, and second T-bracket clamp.
Figure 2:
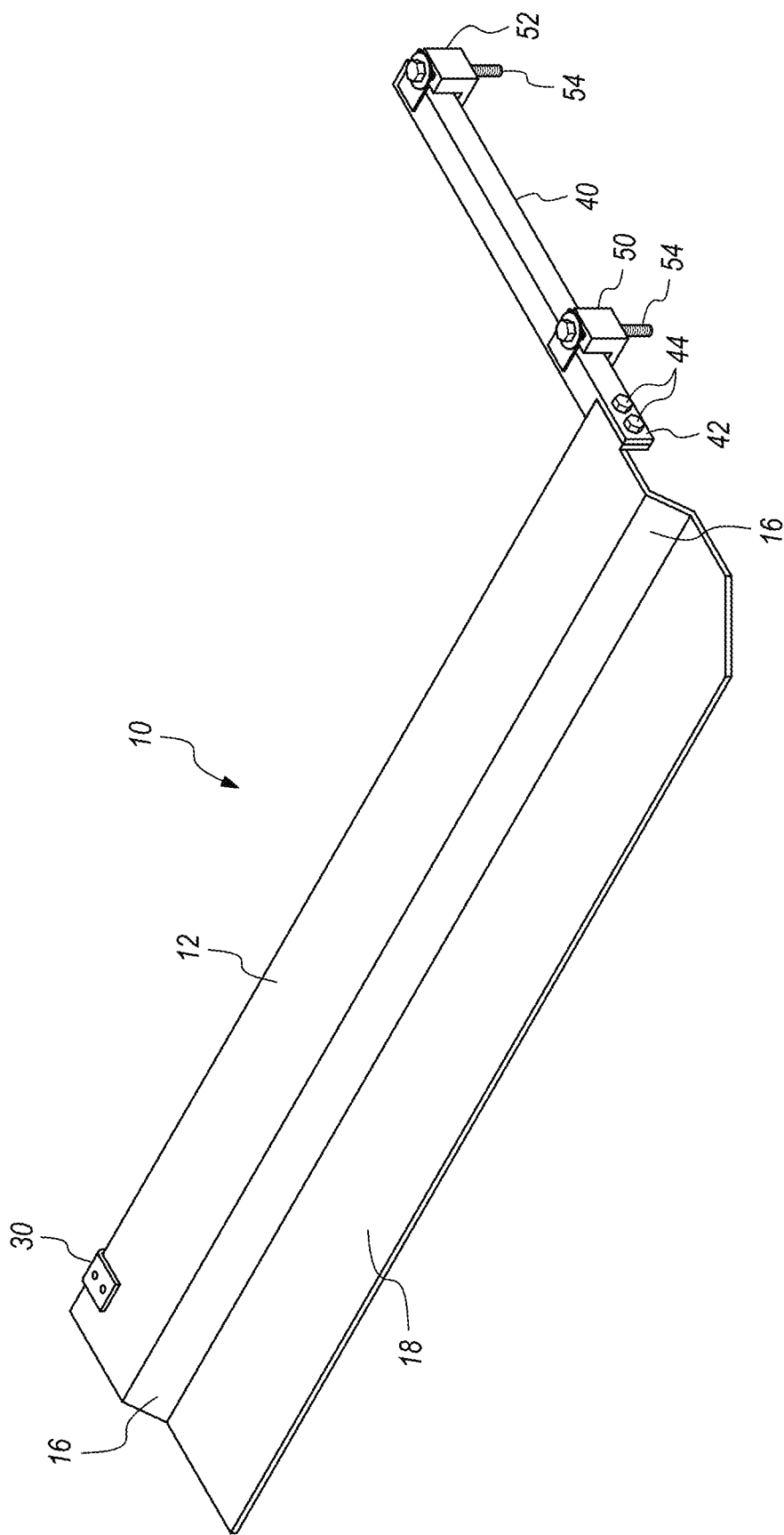
FIG. 2 is an outer perspective view of base plate assembly, T-bracket, base plate clamp bracket, first T-bracket clamp, and second T-bracket clamp.

| Term | Definition |
| --- | --- |
| 5 | Multi-Sport Rack that is Reversibly Attachable to a Pickup Truck Bed with a Bed Shell, Bed Cap, or Tonneau Cover |
| 10 | Base Plate Assembly |
| 12 | Top Plate |
| 14 | T-Bracket Mounting Flange |
| 15 | Base Plate Clamp Bracket Mounting Hole |
| 16 | Side Plate |
| 18 | Bottom Plate |
| 20 | Inside Wall Locating Flange |
| 30 | Base Plate Clamp Bracket |
| 32 | Base Plate Clamp Bracket Bolt or Screw |
| 40 | T-Bracket |
| 42 | Base Plate Mounting Flange |
| 44 | Base Plate Mounting Bolt |
| 46 | First T-Bracket Clamp Tab |
| 48 | Second T-Bracket Clamp Tab |
| 50 | First T-Bracket Clamp |
| 52 | Second T-Bracket Clamp |
| 54 | T-Bracket Clamp Bolt |
| 60 | Inner Base Rail |
| 62 | Outer Base Rail |
| 64 | Front Stanchion Assembly |
| 66 | Front Ratcheting Tire Clamp |
| 68 | Rear Stanchion Assembly |
| 70 | Rear Ratcheting Tire Clamp |
| 80 | First Harp Member |
| 82 | Second Harp Member |
| 84 | First Harp Attachment Bracket |
| 86 | Second Harp Attachment Bracket |
| 88 | First Harp Clamp |

-continued

| Term | Definition |
| --- | --- |
| 90 | Second Harp Clamp |
| 95 | Diagonal Strap |
| 97 | Board and Ski Webbing |
| 100 | Pickup Truck |
| 102 | Pickup Truck Bed |
| 110 | Bed Shell, Bed Cap, or Tonneau Cover |
| 120 | Bicycle |
| 122 | Bicycle Tire |
| 124 | Snow Board |
| 126 | Skis |

DETAILED DESCRIPTION OF THE INVENTION

Multi-sport rack that is reversibly attachable to a pickup truck bed with a bed shell, bed cap, or tonneau cover 5 is a multi-sport rack that is rigidly attachable to a pickup truck bed 102 that also has a bed shell, bed cap, or tonneau cover 110 installed thereon. Multi-sport rack that is reversibly attachable to a pickup truck bed with a bed shell, bed cap, or tonneau cover 5 is also rigidly attachable to a naked pickup truck bed 102 without a bed shell, bed cap, or tonneau cover 110 installed thereon. Multi-sport rack that is reversibly attachable to a pickup truck bed with a bed shell, bed cap, or tonneau cover 5 has a special base plate assembly 10 that is clamped and rigidly attached to the pickup truck bed 102, in between the pickup truck bed 102 and the bed shell, bed cap, or tonneau cover 110 in order to yield a very strong and rigid attachment of the multi-sport rack 5 to the pickup truck 100.

Multi-sport rack that is reversibly attachable to a pickup truck bed with a bed shell, bed cap, or tonneau cover 5 comprises: a base plate assembly 10.

Base plate assembly 10 is a custom shaped rigid plate assembly. Base plate assembly 10 has a complex shape that was designed to yield high strength and rigidity in order to provide solid and stable attachment of a bicycle 120, surf board, snow board 124, or skis 126 to the multi-sport rack 5 and solid and stable attachment of the multi-sport rack 5 to the pickup truck 100. Base plate assembly 10 and its attachment method to the pickup truck bed 102 yield a super rigid structure that keeps the multi-sport rack 5 and bicycle 120, snow board 124, surf board, or skis 126 steady and free from vibrations during travel.

Base plate assembly 10 comprises: a top plate 12; a side plate 16; and a bottom plate 18. Top plate 12, side plate 16, and a bottom plate 18 are connected together or formed together to yield the base plate assembly 10. As discussed below, base plate assembly 10 may comprise individual sheets of material that are attached together or may be stamped or forged from one sheet of material. Any known method of fabrication may be used to construct the specific rigid shape of base plate assembly 10 which is defined as follows.

Please note that throughout this writing, front or frontwards references the end or direction that is adjacent to the front of the pickup truck 100 that the multi-sport rack 5 is attached to. Likewise, rear or rearwards references the end or direction that is adjacent to the rear of the pickup truck 100. Inner or inside references the end or direction that is adjacent to the pickup truck 100. Outer or outside references the end or direction that is not adjacent to or opposite to the pickup truck 100.

Top plate 12 is a rigid rectangular member. Top plate 12 is a rigid rectangular horizontal planar member or sheet of material with a plane, a front edge, a rear edge, an outer edge, an inner edge, an upper surface, a lower surface, a thickness, a longitudinal axis, and a latitudinal axis. Top plate 12 has a length of about 2-10 feet. Top plate 12 has a width of about 2-24 inches. As detailed below, the top plate 12 is clamped or sandwiched between the bed shell, bed cap, or tonneau cover 110 and the pickup truck bed 102 in order to install the multi-sport rack 5 on a pickup truck 100.

Side plate 16 is a rigid rectangular planar member or sheet of material with a plane, a front edge, a rear edge, an inner edge, an outer edge, an upper surface, a lower surface, a length, a width, a thickness, a longitudinal axis, and a latitudinal axis. Side plate 16 is rigidly attached to the top plate 12 and the bottom plate 18. Side plate 16 is a diagonal member that lies on a diagonal plane. The length of side plate 16 is equal to that of top plate 12. The width of side plate 16 is about 2-20 inches.

Bottom plate 18 is a rigid planar horizontal member or sheet of material with a plane, a front edge, a rear edge, an inner edge, an outer edge, an upper surface, a lower surface, a length, a width, a length, a thickness, a longitudinal axis, and a latitudinal axis. Bottom plate 18 is rigidly attached to the side plate 16. Bottom plate 18 is a horizontal member. The length of bottom plate 18 is equal to that of top plate 12. The width of bottom plate 18 is about 2-24 inches.

Top plate 12, side plate 16, and bottom plate 18 are connected together in the following way to form the base plate assembly 10. The longitudinal axes of the top plate 12, side plate 16, and bottom plate 18 are parallel. The plane of top plate 12 is parallel with the plane of bottom plate 18. The outer edge of top plate 12 is joined with or rigidly attached to the inner edge of side plate 16. The plane of top plate 12 meets the plane of side plate 16 at an angle that is greater than 180 degrees and less than 270 degrees. The lower surface of top plate 12 and the lower surface of side plate 16 form an angle less than 180 degrees. The upper surface of top plate 12 and the upper surface of side plate 16 form an angle greater than 180 degrees. The outer edge of side plate 16 is joined with or rigidly attached to the inner edge of bottom plate 18. The front edge of top plate 12 is aligned with and even with the front edge of side plate 16 and the front edge of bottom plate 18. The rear edge of top plate 12 is aligned with and even with the rear edge of side plate 16 and the rear edge of bottom plate 18. In best mode, the corner between the front edge and outer edge of bottom plate 18 is diagonal cut to yield a shaved corner or more rounded corner.

The rigid attachment of plates 12, 16, 18 may be accomplished by any known means such as: brake bending, die press bending, pressed seam, weld, solder, glue, epoxy, adhesive, bolts, screws, rivets, clips, snaps, pins, or fasteners. Base plate assembly 10 may be: a one-piece integral structure that was stamped or forged from one piece of material, a multi-piece structure that was attached together to form the shape, or any combination thereof. Base plate assembly 10 may be made of any known material such as: metal, steel, aluminum, polymer, plastic, composite, wood, fiberglass, ceramic, carbon fiber, or combination thereof, or any other known material. In best mode, base plate assembly is a one-piece integral structure. Base plate assembly 10 is the primary source of the substantial rigidity and sturdiness of the multi-sport rack 5.

Top plate 12 further comprises: a T-bracket mounting flange 14 and one or more base plate clamp bracket mounting holes 15.

T-bracket mounting flange 14 is a rectangular or square extension or ear projecting downward from the front edge of top plate 12. T-bracket mounting flange 14 is located on the front edge of top plate 12 adjacent to the inner edge of top plate 12, as depicted. T-bracket mounting flange 14 has an upper edge, a lower edge, an inner edge, an outer edge, a front surface, a rear surface, a plane, a length, a width, and a thickness. T-bracket mounting flange 14 has at least one hole through its center which receives one or more base plate mounting bolts 44, as discussed below. The upper edge of T-bracket mounting flange 14 is rigidly attached to the front edge of top plate 12 to form a right angle there between. The plane of T-bracket mounting flange 14 is perpendicular with the plane of top plate 12. In best mode, T-bracket mounting flange 14 is integral with top plate 12 and made from the same piece of material. T-bracket mounting flange 14 has one or more mounting holes as depicted which are used to mount T-Bracket 40 as discussed below. In best mode, each one or more mounting hole on T-bracket mounting flange 14 is a tapped hole that engages with a base plate mounting bolt 44. In an alternate mode, each one or more mounting hole on T-bracket mounting flange 14 engages with the head on each base plate mounting bolt 44 so that the head on base plate mounting bolt 44 is held in place and does not rotate when a nut is tightened on the threaded end of base plate mounting bolt 44.

Each one or more base plate clamp bracket mounting holes 15 is a is a circular hole or slotted hole through the top plate 12 at a location towards rear edge of top plate 12. Each one or more base plate clamp bracket mounting holes 15 has a longitudinal axis that is perpendicular to that of top plate 12. Each one or more base plate clamp bracket mounting holes 15 functions as a mounting hole for base plate clamp bracket 30, as discussed below.

Figure 3:
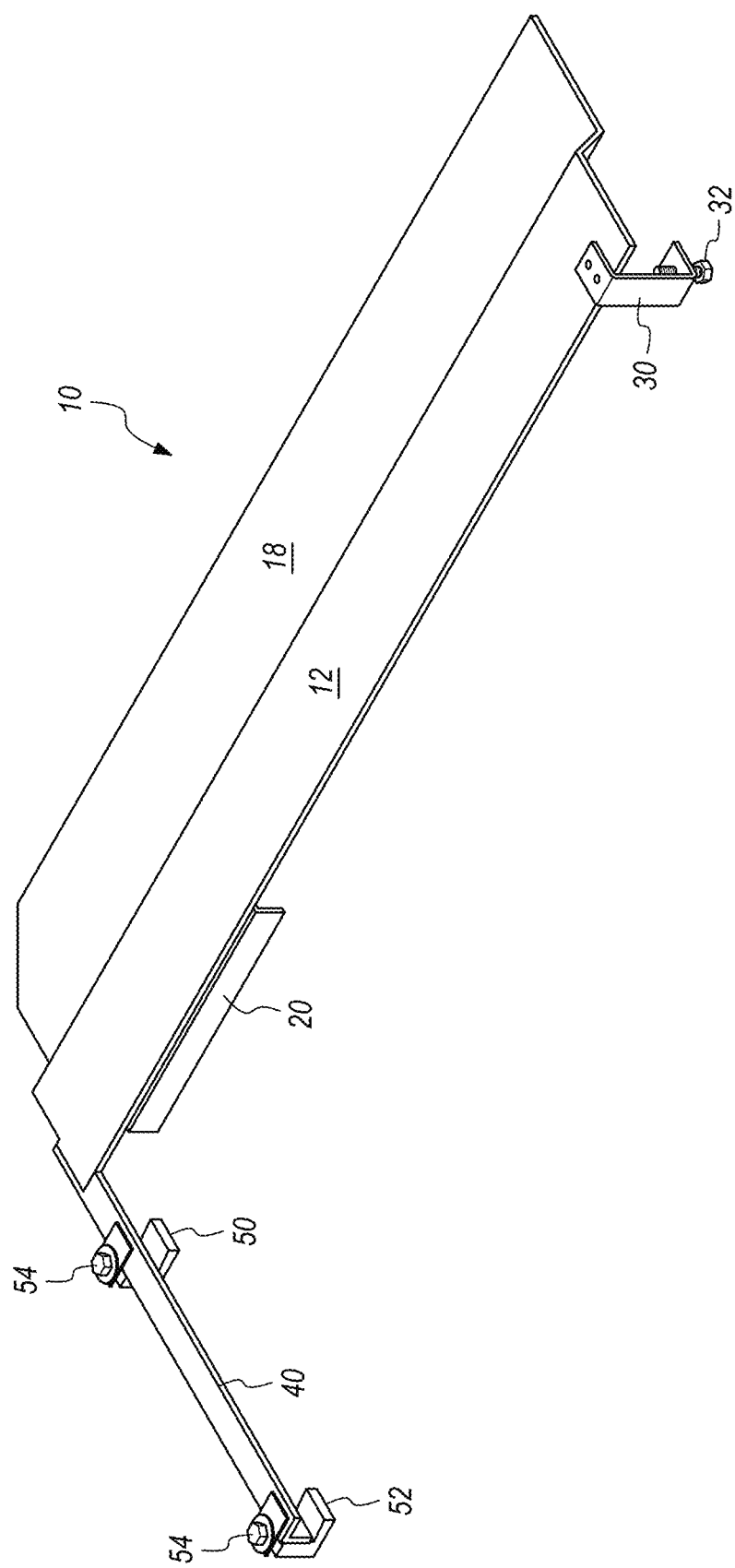
FIG. 3 is an inner perspective view of base plate assembly, T-bracket, base plate clamp bracket, first T-bracket clamp, and second T-bracket clamp.
Figure 4:
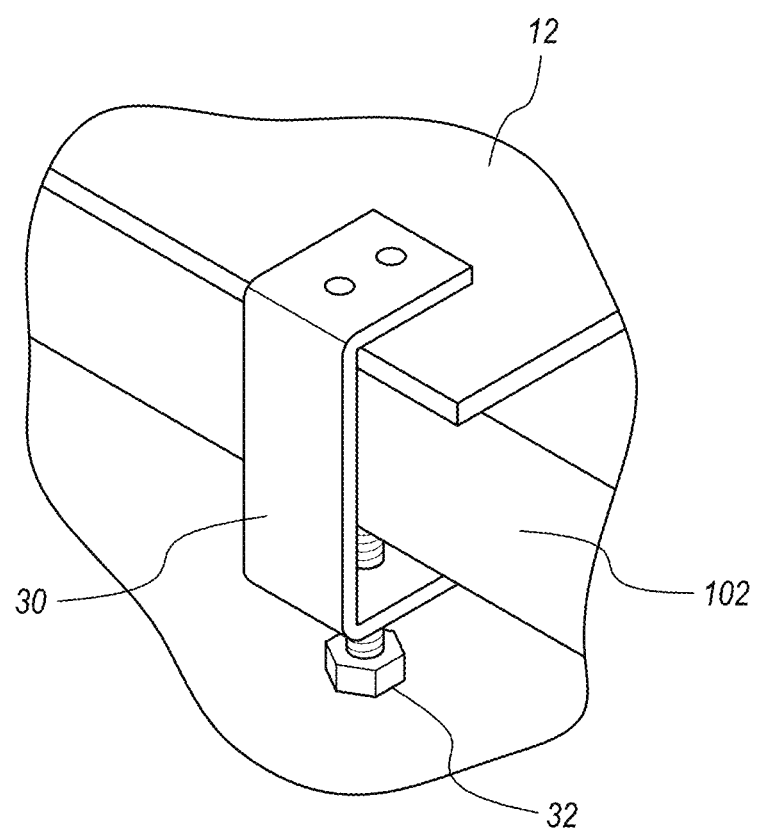
FIG. 4 is an enlarged view of base plate clamp bracket attached to a pickup truck bed.
Figure 5:
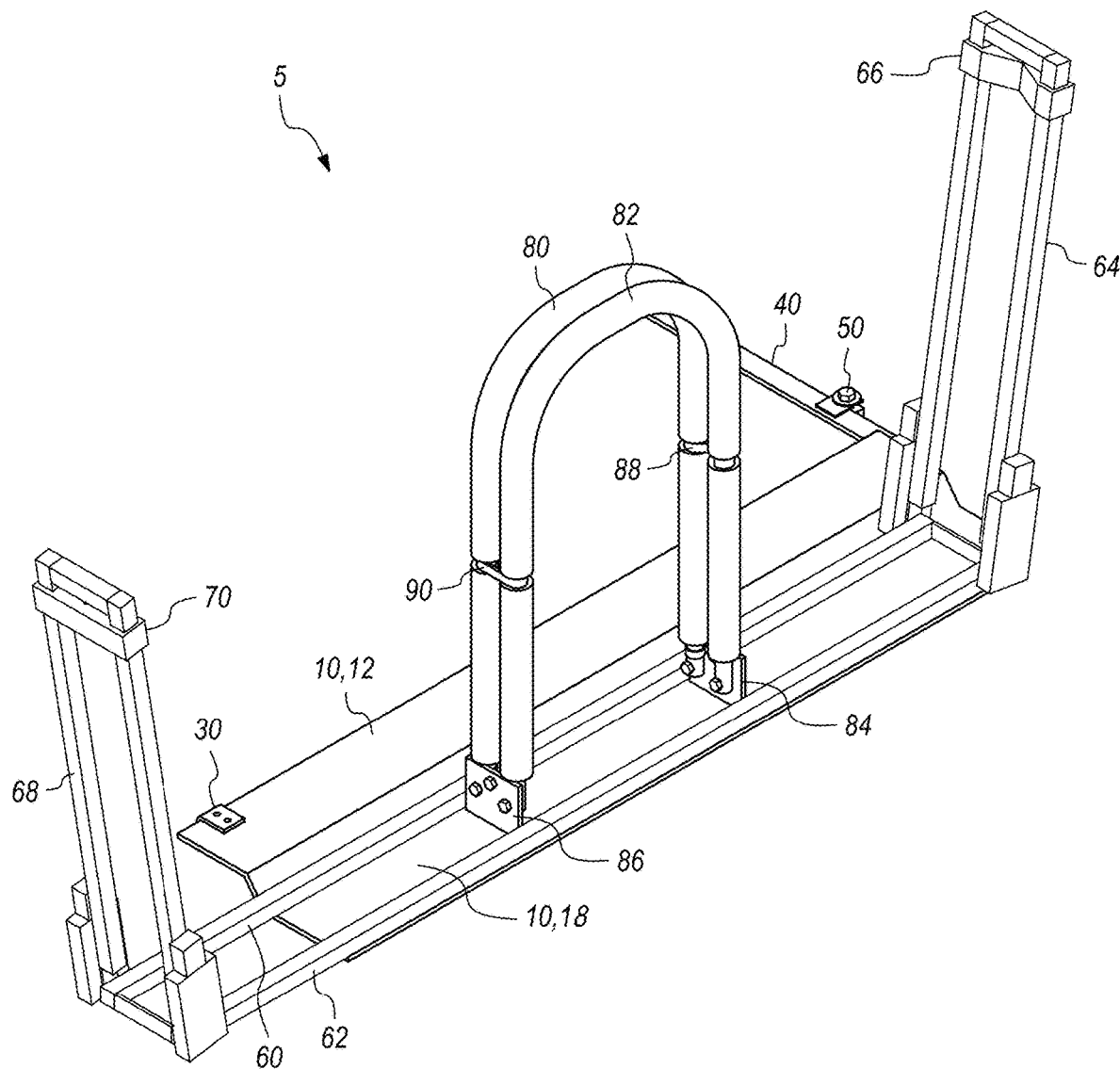
FIG. 5 is a perspective view of multi-sport rack that is reversibly attachable to a pickup truck bed with a bed shell, bed cap, or tonneau cover.

Base plate assembly 10 further comprises an inside wall locating flange 20. Inside wall locating flange 20 is an oblong rigid planar member or bi-planar member. Inside wall locating flange 20 has a tab, flap, or projection that extends perpendicularly downward from the lower surface of top plate 12 as depicted in FIG. 3. tab, flap, or projection has: a length, a width, a thickness, an inner surface, an outer surface, a front edge, a rear edge, an upper edge, a lower edge, a longitudinal axis, and a plane. This tab, flap, or projection is rigidly attached to the lower surface of top plate 12, adjacent to the front edge of top plate 12 so that: 1) the longitudinal axis of the tab, flap, or projection is parallel with the inner edge of top plate 12; 2) the plane of the tab, flap, or projection is perpendicular to that of top plate 12; and 3) the inner surface of the tab, flap, or projection is flush with the inner edge of top plate 12. This tab, flap, or projection functions to help align and locate the whole base plate assembly 10 properly onto the pickup truck bed 102 where the outside surface of the tab, flap, or projection is pressed and held against the inside wall of the pickup truck ped 102 and then the base plate clamp bracket 30 is attached as described in detail below. The inside wall locating flange 20 also functions to help retain the base plate assembly 10 onto the pickup truck bed 102 and prevent the base plate assembly 10 from sliding off the pickup truck bed 102 during use. In best mode, inside wall locating flange 20 is a length of angle iron or angle steel as depicted wherein one planar member of the angle iron acts as the tab, flap, or projection and the other planar member of the angle iron is a mounting flange that is used to weld or otherwise rigidly attach to the inside wall locating flange 20 to top plate 12. Thus, the length of angle iron or steel is a bi-planar member.

Multi-sport rack that is reversibly attachable to a pickup truck bed with a bed shell, bed cap, or tonneau cover 5 further comprises a base plate clamp bracket 30. Base plate clamp bracket 30 is essentially a C-clamp that has been rigidly attached to top plate 12. Base plate clamp bracket 30 has a rigid C-shaped frame with an upper end and a lower end. The upper end of the C-shaped frame is rigidly attached to the upper surface of the top plate 12, adjacent to the rear edge of top plate 12. The lower end of the C-shaped frame is fitted with a base plate clamp bracket bolt 32. Base plate clamp bracket bolt 32 is a male threaded member that engages with a female thread on the lower end of base plate clamp bracket 30. Base plate clamp bracket bolt 32 is tightened in order to clamp onto the pickup truck bed 102 and loosened in order to release from the pickup truck bed 102. Base plate clamp bracket 30 functions to clamp and rigidly attach base plate assembly 10 to the pickup truck bed 102.

Multi-sport rack that is reversibly attachable to a pickup truck bed with a bed shell, bed cap, or tonneau cover 5 further comprises: a T-bracket 40; one or more base plate mounting bolts 44; a first T-bracket clamp 50; and a second T-bracket clamp 52.

T-bracket 40 is a length of angle iron or angle steel. T-bracket 40 is a length of rigid biplanar angular material where the two planes meet at a ninety-degree angle. T-bracket 40 has a rigid horizontal planar member with a length, a width, a height, a longitudinal axis, an inside end, an outside end, an upper surface, a lower surface, a front surface, and a rear surface. T-bracket 40 has a rigid vertical planar member with a length, a width, a height, a longitudinal axis, an inside end, an outside end, an upper surface, a lower surface, a front surface, and a rear surface. The upper edge of vertical planar member is rigidly connected to the front edge of horizontal planar member at a ninety-degree angle to form the angular shape. The front surface of T-bracket 40 is the vertical planar member. The upper surface of T-bracket 40 is the horizontal planar member. In best mode, vertical planar member and horizontal planar member are integral and made of the same piece of material. The length of T-bracket 40 is about 10-50 inches. The width of T-bracket 40 is about 0.5-8 inches. The height of T-bracket 40 is about 0.5-8 inches.

The outside end of T-bracket 40 has a base plate mounting flange 42. Base plate mounting flange 42 is an extension of vertical planar member beyond the outside edge of horizontal planar member as depicted. Base plate mounting flange 42 is a rectangular or rectangular tab or flange. Base plate mounting flange 42 is a rigid vertical planar member. Base plate mounting flange 42 functions to mate with and rigidly attach to T-bracket mounting flange 14 on top plate 12. Base plate mounting flange 42 has one or more mounting holes as depicted which are used to mount to T-bracket mounting flange 14. One or more base plate mounting bolts 44 are used to accomplish this rigid attachment.

T-bracket 40 further comprises: a first T-bracket clamp tab 46 and a second T-bracket clamp tab 48. First and second T-bracket clamp tabs 46,48, along with first and second T-bracket clamps 50,52, function to rigidly attach T-bracket 40 to the pickup truck bed 102 as discussed below. Each of first and second T-bracket clamp tabs 46,48 is a rigid horizontal planar member with: a length, a width, an upper surface, a lower surface, an inside edge, an outside edge, a front edge, and a rear edge. The lower surface of first and second T-bracket clamp tabs 46,48 is rigidly attached to the upper surface of T-bracket 40. Each of first and second T-bracket clamp tabs 46,48 has an open slotted hole that breaks through its outside edge as depicted. Each open slotted hole has a longitudinal axis that is parallel with that of T-bracket 40. The open slotted holes function as mounting holes or mounting slots for first and second T-bracket clamps 50,52 respectively. The open slotted holes have an opening on the outer edge or break through the outer edge of T-bracket clamp tabs 46,48 so that the T-bracket clamp bolts 54 may be installed more easily as discussed below.

Each of the one of more base plate mounting bolts 44 is a bolt, screw, or fastener that functions to help rigidly attach T-bracket 40 to base plate assembly 10. Each of the one of more base plate mounting bolts 44 has a threaded end and a head. In best mode, the threaded end of each base plate mounting bolt 44 engages with female thread on the T-bracket mounting flange 14. In an alternate mode, the head on each base plate mounting bolt 44 engages with a mounting hole on the T-bracket mounting flange 14 or a mounting hole on the base plate mounting flange 42 so that the head on base plate mounting bolt 44 is held in place and does not rotate when a nut is tightened on the threaded end of base plate mounting bolt 44.

Multi-sport rack that is reversibly attachable to a pickup truck bed with a bed shell, bed cap, or tonneau cover 5 further comprises: a first T-bracket clamp 50 and a second T-bracket clamp 52. First and second T-bracket clamp clamps 50,52, along with T-bracket clamp tabs 46,48, function to rigidly attach T-bracket 40 to the pickup truck bed 102 as discussed below. Each of first and second T-bracket clamps 50,52 is a short length of angle iron or angle steel. Each of first and second T-bracket clamps 50,52 is a length of rigid biplanar angular material where the two planes meet at a ninety-degree angle to. Each of first and second T-bracket clamps 50,52 has a horizontal planar member, a vertical planar member, a length, a width, a height, a longitudinal axis, an inside end, an outside end, a first upper surface, a second upper surface, a lower surface, a front surface, a first rear surface, and a rear surface. The front surface of each T-bracket clamp 50,52 is the vertical planar member. The lower surface of each T-bracket clamp 50,52 is the horizontal member. The lower edge of vertical planar member is rigidly connected to the front edge of horizontal member at a ninety-degree angle to form the angular shape. In best mode, vertical planar member and horizontal planar member are integral and made of the same piece of material. The length of each T-bracket clamp 50,52 is about 1-5 inches. The width of each T-bracket clamp 50,52 is about 0.5-8 inches. The height of each T-bracket clamp 50,52 is about 0.5-8 inches. The vertical planar member is thicker than the horizontal planar member. The vertical planar member is thick enough to have a female tapped or threaded hole running completely through it. The female tapped or threaded hole has a longitudinal axis that parallel to the vertical planar member and perpendicular to the horizontal planar member. The female tapped or threaded hole is sized to engage with a T-bracket clamp bolt 54.

Each of first and second T-bracket clamps 50,52 further comprise a T-bracket clamp bolt 54. Each T-bracket clamp bolt 54 is a bolt, screw, or fastener with a threaded end and a head. Each T-bracket clamp bolt 54 is sized to engage with the female tapped or threaded hole in first and second T-bracket clamp clamps 50,52. Each T-bracket clamp bolt 54 is sized to slide into the open slotted hole in first and second T-bracket clamp tabs 46,48 to make a clearance fit therein. T-bracket clamp bolts 54 functions to clamp down onto first and second T-bracket clamp tabs 46,48 and the bed wall of the pickup truck bed 102. The head of each T-bracket clamp bolt 54 engages with first and second T-bracket clamp tabs

46,48. The horizontal planar members of first and second T-bracket clamp tabs 46,48 engage with the bed wall of the pickup truck bed 102. When T-bracket clamp bolts 54 is tightened, this draws the T-bracket clamp tabs 46,48 downward and the horizontal planar members of first and second T-bracket clamp tabs 46,48 upwards to clamp the T-bracket 40 onto the pickup truck bed 102, as discussed below.

Multi-sport rack that is reversibly attachable to a pickup truck bed with a bed shell, bed cap, or tonneau cover 5 further comprises: an inner base rail 60; an outer base rail 62; a front stanchion assembly 64; a front ratcheting tire clamp 66; a rear stanchion assembly 68; and a rear ratcheting tire clamp 70.

Inner base rail 60 is a rigid horizontal structural member. Inner base rail 60 has a length, a width, a height, an upper surface, a lower surface, an inner surface, an outer surface, a front end, a rear end, and a longitudinal axis. The length of inner base rail 60 is longer than a bicycle's axle-to-axle distance but shorter than a bicycle's outer length dimension or tire-to-tire dimension. In best mode, inner base rail 60 is a length of square or rectangular tubing or solid material.

Outer base rail 62 is a rigid horizontal structural member. Outer base rail 62 has a length, a width, a height, an upper surface, a lower surface, an inner surface, an outer surface, a front end, a rear end, and a longitudinal axis. Outer base rail 62 is a duplicated of inner base rail 60. In best mode, outer base rail 62 is a length of square or rectangular tubing or solid material.

The lower surface of inner base rail 60 is rigidly attached to the upper surface of top plate 12 so that the longitudinal axis of inner base rail 60 is parallel with the longitudinal axis of top plate 12. The lower surface of outer base rail 62 is rigidly attached to the upper surface of top plate 12 so that the longitudinal axis of outer base rail 62 is parallel with the longitudinal axis of top plate 12 and the longitudinal axis of inner base rail 60. The front end of inner base rail 60 is aligned with and even with the front end of outer base rail 62. The rear end of inner base rail 60 is aligned with and even with the rear end of outer base rail 62. The distance between the outer surface of inner base rail 60 and the inner surface of outer base rail 62 is slightly larger than the width of a bicycle tire 122 so that a bicycle tire 122 may freely slide into this gap. Rigid attachment may be accomplished by any known means such as: weld, solder, glue, epoxy, adhesive, bolts, screws, rivets, clips, snaps, pins, or fasteners. In best mode, attachment is accomplished by fasteners. Note that the length of bottom plate 18 can be shorter than the length of inner and outer base rails 80,82 as depicted.

Front stanchion assembly 64 comprises an inner stanchion and an outer stanchion. Inner stanchion on front stanchion assembly 64 is a rigid near vertical or upright structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on front stanchion assembly 64 is a rigid near vertical or upright structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 60. The inner surface of the lower end of outer stanchion is pivotally attached to the outer surface of the front end of outer base rail 62. Pivotal attachment is such that inner and outer stanchions may be rotated to any position along a half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even continuous gap there between. This is accomplished by a structural member with a first end rigidly attached to the outer surface of the upper end of inner stanchion and a second end rigidly attached to the inner surface of the upper end of the outer stanchion.

Front stanchion assembly 64 rotates around the attachment points to inner and outer base rails 80,82, which are pivot points. Front stanchion assembly 64 may be rotated from a zero to 180 degrees between front stanchion assembly 64 and the inner and outer base rails 80,82. Thus, front stanchion assembly 64 may be rotated to zero degrees when not in use and not carrying a bicycle 120 and then all the back out to 180 degrees when mounting a bicycle 120 on the multi-sport rack 5.

Front ratcheting tire clamp 66 is a rigid horizontal structural member that is slidably attached to inner and outer stanchions on front stanchion assembly 64. The slidable attachment is such that front ratcheting tire clamp 66 remains perpendicular to inner and outer stanchions on front stanchion assembly 64 while it slides upwards and downwards along the lengths or longitudinal axes of inner and outer stanchions on front stanchion assembly 64. Further the slidable attachment is biased or ratcheted in that the front ratcheting tire clamp 66 freely slides downwards but is restricted from any upward movement without first releasing a ratchet catch.

Rear stanchion assembly 68 comprises an inner stanchion and an outer stanchion. Inner stanchion on rear stanchion assembly 68 is a rigid near vertical or upright structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on rear stanchion assembly 68 is a rigid near vertical or upright structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 60. The inner surface of the lower end of outer stanchion is pivotally attached to the outer surface of the front end of outer base rail 62. Pivotal attachment is such that inner and outer stanchions may be rotated to any position along the half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even gap there between. This is accomplished by a structural member with a first end rigidly attached to the outer surface of the upper end of inner stanchion and a second end rigidly attached to the inner surface of the upper end of the outer stanchion.

Rear stanchion assembly 68 rotates around the attachment points to inner and outer base rails 80,82, which are pivot points. Rear stanchion assembly 68 may be rotated from a zero to 180 degrees between rear stanchion assembly 68 and the inner and outer base rails 80,82. Thus, rear stanchion assembly 68 may be rotated to zero degrees when not in use and not carrying a bicycle 120 and then all the back out to 180 degrees when mounting a bicycle 120 on the multi-sport rack 5.

Rear ratcheting tire clamp 70 is a rigid horizontal structural member that is slidably attached to inner and outer stanchions on rear stanchion assembly 68. The slidable attachment is such that rear ratcheting tire clamp 70 remains perpendicular to inner and outer stanchions on rear stanchion assembly 68 while it slides upwards and downwards along the lengths or longitudinal axes of inner and outer stanchions on rear stanchion assembly 68. Further the slidable attachment is biased or ratcheted in that the rear ratcheting tire clamp freely slides downwards but is restricted from any upward movement without first releasing a ratchet catch.

Multi-sport rack that is reversibly attachable to a pickup truck bed with a bed shell, bed cap, or tonneau cover 5 further comprises: a first harp member 80; a second harp member 82; a first harp attachment bracket 84; a second harp attachment bracket 86; a first harp clamp 88; and a second harp clamp 90.

First harp member 80 is a length of rigid material with a two-segmented 180-degree bends to form a bow shape or harp shape. First harp member 80 has a first end, a first ninety-degree bend, a second ninety-degree bend, and a second end, as depicted. First harp member 80 also has a longitudinal axis running parallel to the first and second ends of first harp member. First harp member 80 is covered or encapsulated by foam or cushioning in order to protect and not damage the surface of the snow boards 124, surf boards, or skis 126. In best mode, first harp member 80 is a length of tubular material with a hollow core which allows for reduced weight.

Second harp member 82 is a length of rigid material with a two-segmented 180-degree bends to form a bow shape or harp shape. Second harp member 82 has a first end, a first ninety-degree bend, a second ninety-degree bend, and a second end, as depicted. Second harp member 82 also has a longitudinal axis running parallel to the first and second ends of second harp member. Second harp member 82 is covered or encapsulated by foam or cushioning in order to protect and not damage the surface of the snow boards 124, surf boards, or skis 126. In best mode, second harp member 82 is a length of tubular material with a hollow core which allows for reduced weight.

First harp attachment bracket 84 has a rigid vertical planar member with an upper edge, a lower edge, an inner edge, an outer edge, a front surface and a rear surface. The lower edge of first harp attachment bracket 84 is rigidly attached to the upper surface of bottom plate 18 adjacent to the front edge of bottom plate 18 so that the vertical planar member of first harp attachment bracket 84 is perpendicular to the plane of bottom plate 18 and the lower edge of first harp attachment bracket 84 is perpendicular to the longitudinal axes of inner and outer base rails 60,62. Rigid attachment may be accomplished by any known means such as: weld, solder, glue, epoxy, adhesive, bolts, screws, rivets, clips, snaps, pins, or fasteners.

Second harp attachment bracket 86 has a rigid vertical planar member with an upper edge, a lower edge, an inner edge, an outer edge, a front surface, and a rear surface. The lower edge of second harp attachment bracket 86 is rigidly attached to the upper surface of bottom plate 18 adjacent to the rear edge of bottom plate 18 so that the vertical planar member of second harp attachment bracket is perpendicular to the plane of bottom plate 18 and the lower edge of second harp attachment bracket 86 is perpendicular to the longitudinal axes of inner and outer base rails 60,62. Rigid attachment may be accomplished by any known means such as: weld, solder, glue, epoxy, adhesive, bolts, screws, rivets, clips, snaps, pins, or fasteners.

The first end of first harp member 80 is reversibly rigidly attached to first harp attachment bracket 84 adjacent to the inner edge of first harp attachment bracket 84. The second end of first harp member 80 is reversibly rigidly attached to the second harp attachment bracket 86 adjacent to the inner edge of second harp attachment bracket 86. First harp member 80 is attached to first and second harp attachment brackets 84,86 so that the longitudinal axis of first harp member 80 is essentially perpendicular to the plane of bottom plate 18. Reversible rigid attachment may be accomplished by any known means such as: bolts, screws, rivets, clips, snaps, pins, or fasteners. This attachment is reversible to allow for the first harp member 80 to be removed in order to make room for a bicycle 120 to be loaded onto the multi-sport rack 5.

The first end of second harp member 82 is reversibly pivotally attached to first harp attachment bracket 84 adjacent to the outer edge of first harp attachment bracket 84. The second end of second harp member 82 is reversibly pivotally attached to the second harp attachment bracket 86 adjacent to the outer edge of second harp attachment bracket 86. Reversibly pivotal attachment may be accomplished by any known means such as: bolts, screws, rivets, clips, snaps, pins, or fasteners. The pivotal attachment of second harp member 82 to first and second harp attachment brackets 84,86 allows the second harp member 82 to rotate around these attachment points and to swing outwards and inwards. As discussed below, this rotation allows for snow boards 124, surf boards, and skis 126 to be loaded onto the multi-sport rack 5. This attachment is reversible to allow for the second harp member 82 to be removed in order to make room for a bicycle 120 to be loaded onto the multi-sport rack 5.

First harp clamp 88 is a rigid C-shaped member. First harp clamp 88 is pivotally attached to first harp member 80, adjacent to the first end of first harp member 80. First harp clamp 88 is reversibly attachable to second harp member 82, adjacent to the first end of second harp member 82. First harp clamp 88 functions to reversibly attach or clamp onto second harp member 82 thereby holding first harp member 80 and second harp member 82 together in order to securely hold a snow board 124, a surf board, and/or skis 126 there between.

Second harp clamp 90 is a rigid C-shaped member. Second harp clamp 90 is pivotally attached to first harp member 80, adjacent to the second end of first harp member 80. Second harp clamp 90 is reversibly attachable to second harp member 82, adjacent to the second end of second harp member 82. Second harp clamp 90 functions to reversibly attach or clamp onto second harp member 82 thereby holding first harp member 80 and second harp member 82 together in order to securely hold a snow board 124, a surf board, and/or skis 126 there between.

Multi-sport rack that is reversibly attachable to a pickup truck bed with a bed shell, bed cap, or tonneau cover 5 further comprises: a diagonal strap 95. Diagonal strap 95 is a length of ratchet strap, cam strap, or tie down strap. Diagonal strap 95 is a strip or ribbon of high strength flexible material that is outfitted with two hooks and a ratchet or cam that is used to tightened the strap. Diagonal strap 95 has an upper end and a lower end. Diagonal strap 95 functions to apply tension between the upper end of front stanchion assembly and the inner end of T-bracket 40. During installation of multi-sport rack 5 onto a pickup truck bed 102, the lower end of diagonal strap 95 is attached to the inner end of T-bracket 40, as depicted. The upper end of diagonal strap 95 is attached to the upper end of the inner stanchion on the front stanchion assembly 64, as depicted. Then the cam or ratchet on diagonal strap 95 is used to tighten and increase tension on diagonal strap 95 which greatly stiffens the whole structure of multi-sport rack 5. When installed properly, diagonal strap 95 provides substantial rigidity to the multi-sport rack 5.

Multi-sport rack that is reversibly attachable to a pickup truck bed with a bed shell, bed cap, or tonneau cover 5 further comprises: a plurality of board and ski webbings 97. Each of the plurality of board and ski webbings 97 is two lengths, strips, or ribbons of high strength flexible material that are stacked together and then stitched or attached together at specific locations. One strip is place on top of the other strip and the two strips are stitched together or otherwise attached together. The stitching or attachment locations are at specific areas along the length of the two strips of material that yield unattached areas or pocket areas that are specifically sized to receive and hold: a snow board 124, a surf board, or a ski 126. The unattached areas or pocket areas are specifically sized to be the width of a snow board 124, a surf board, or a ski 126 plus an inch or more of clearance space. Stitching or attachment may be reversible in order make it easier to load a snow board 124, a surf board, and/or a ski 126 into the board and ski webbings 97. Board and ski webbings 97 function to securely hold snow boards 124, a surf boards, and skis 126 into the multi-sport rack 5. Each of the plurality of board and ski webbings 97 has an upper and a lower end. The upper end of each of the plurality of board and ski webbings 97 is attached to the multi-sport rack 5. The lower end of each of the plurality of board and ski webbings 97 is attached to the multi-sport rack 5. Typically, there are three board and ski webbings 97 on each multi-sport rack 5 with one attached to the front stanchion assembly 64, a second attached to the rear stanchion assembly 68, and a third attached to the first harp member 80, as depicted.

Figure 6:
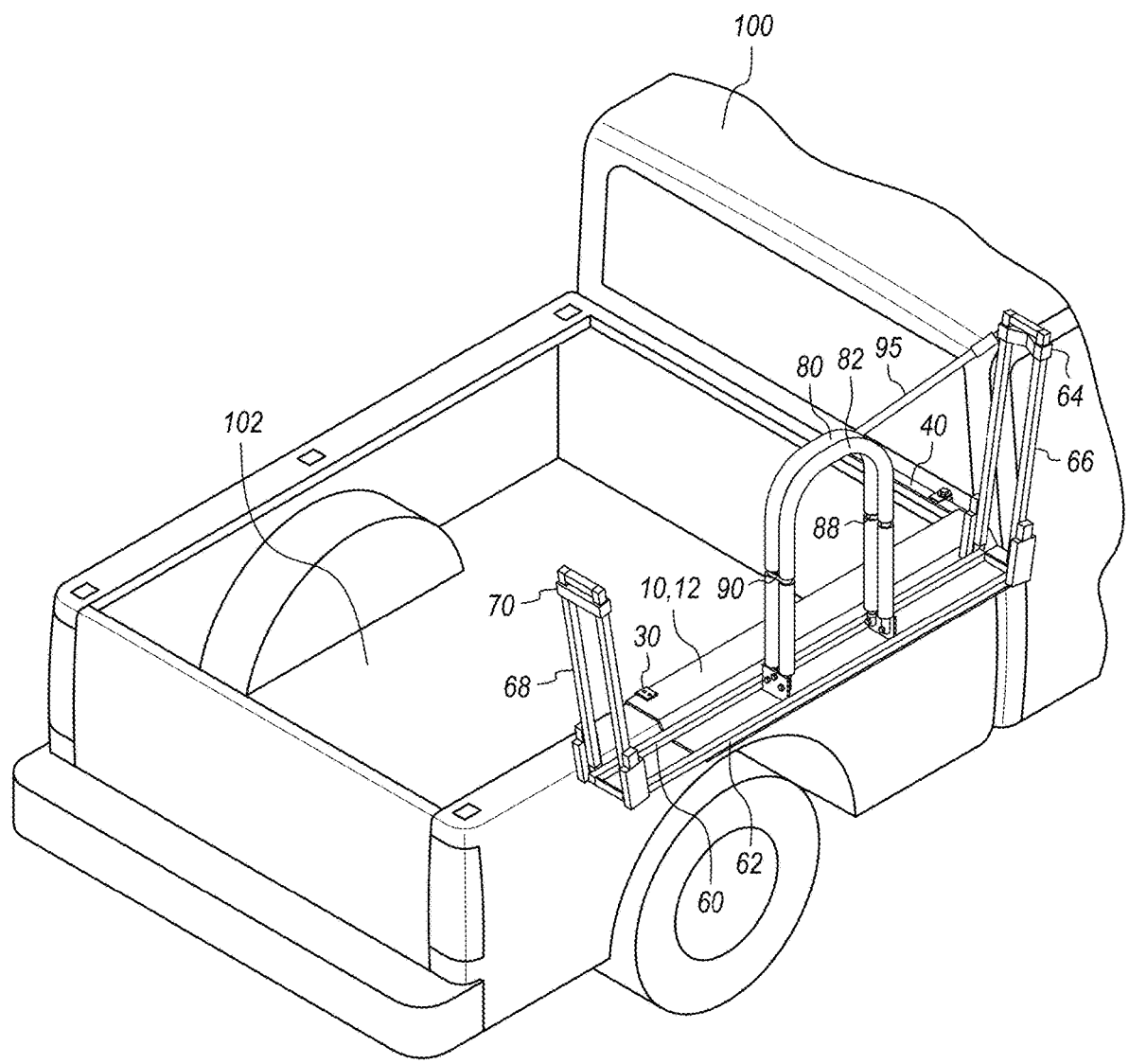
FIG. 6 is a perspective view of multi-sport rack that is reversibly attachable to a pickup truck bed with a bed shell, bed cap, or tonneau cover mounted on a pickup truck without a bed shell, bed cap, or tonneau cover.
Figure 7:
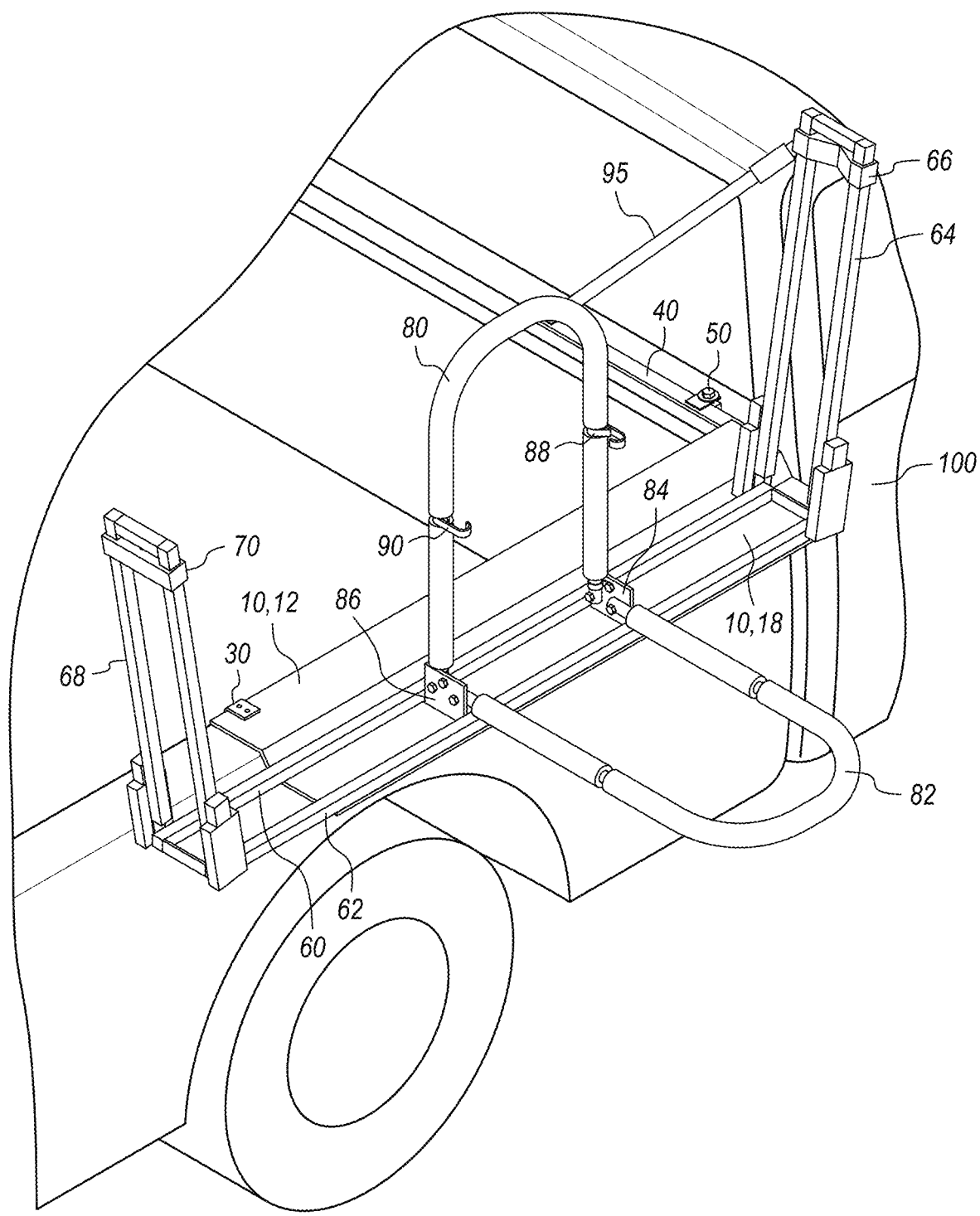
FIG. 7 is a perspective view of multi-sport rack that is reversibly attachable to a pickup truck bed with a bed shell, bed cap, or tonneau cover mounted on a pickup truck without a bed shell, bed cap, or tonneau cover, with second harp member rotated downwards in position to receive a snow board, surf board, and/or skis.
Figure 8:
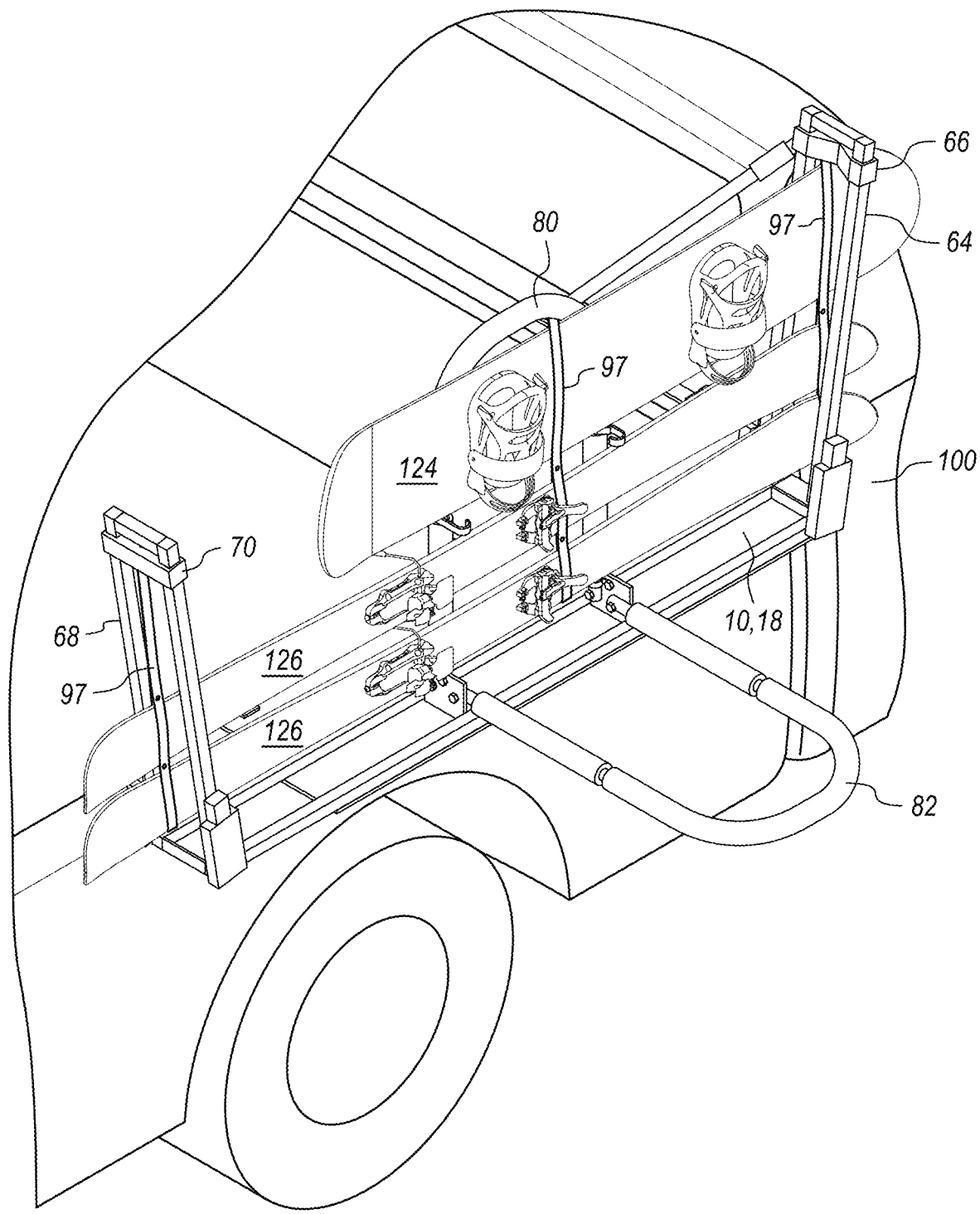
FIG. 8 is a perspective view of multi-sport rack that is reversibly attachable to a pickup truck bed with a bed shell, bed cap, or tonneau cover mounted on a pickup truck without a bed shell, bed cap, or tonneau cover, with a snow board and skis attached and second harp member rotated downwards.
Figure 9:
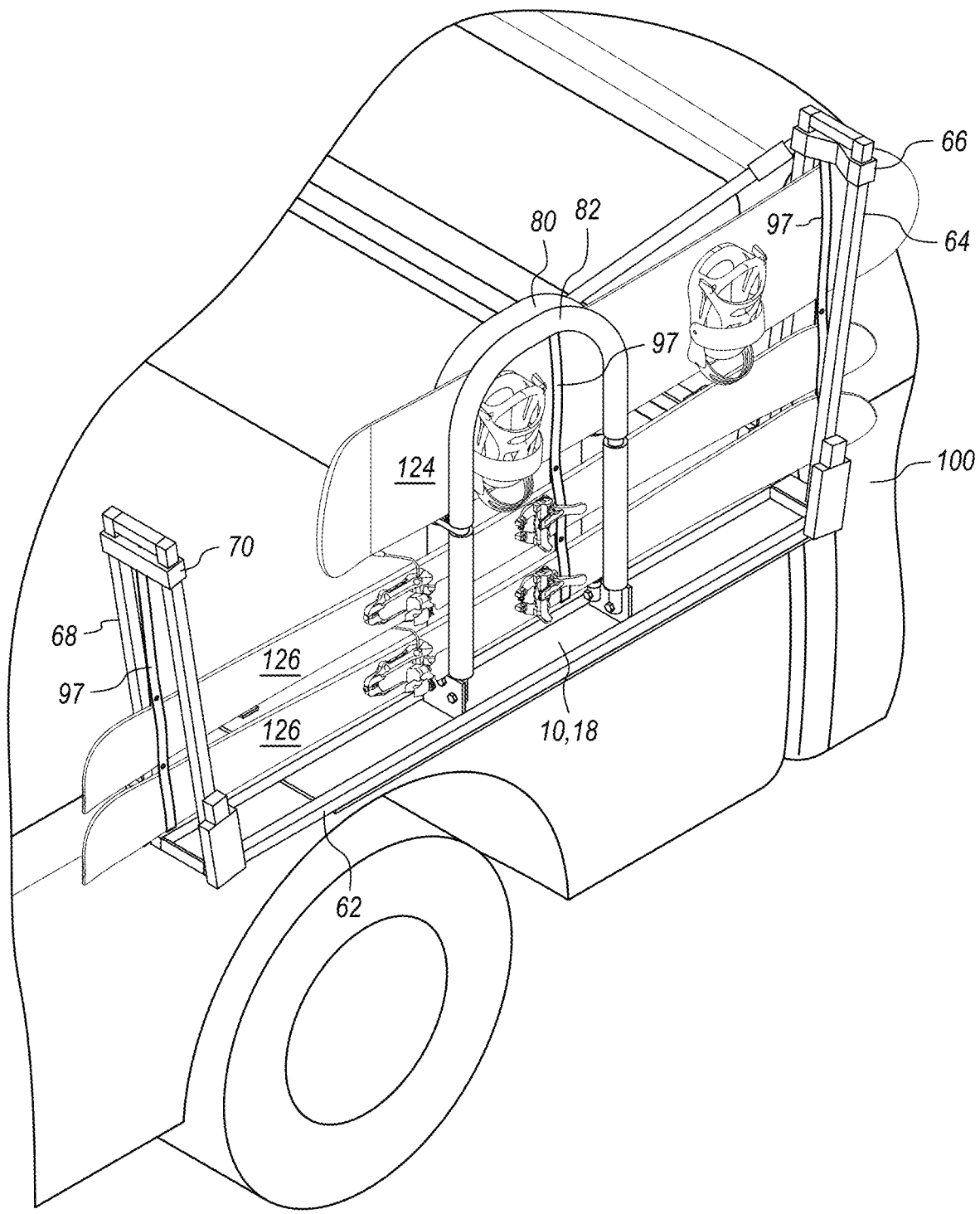
FIG. 9 is a perspective view of multi-sport rack that is reversibly attachable to a pickup truck bed with a bed shell, bed cap, or tonneau cover mounted on a pickup truck without a bed shell, bed cap, or tonneau cover, with a snow board and skis attached and second harp member rotated upwards and clamped shut and against first harp member.
Figure 10:
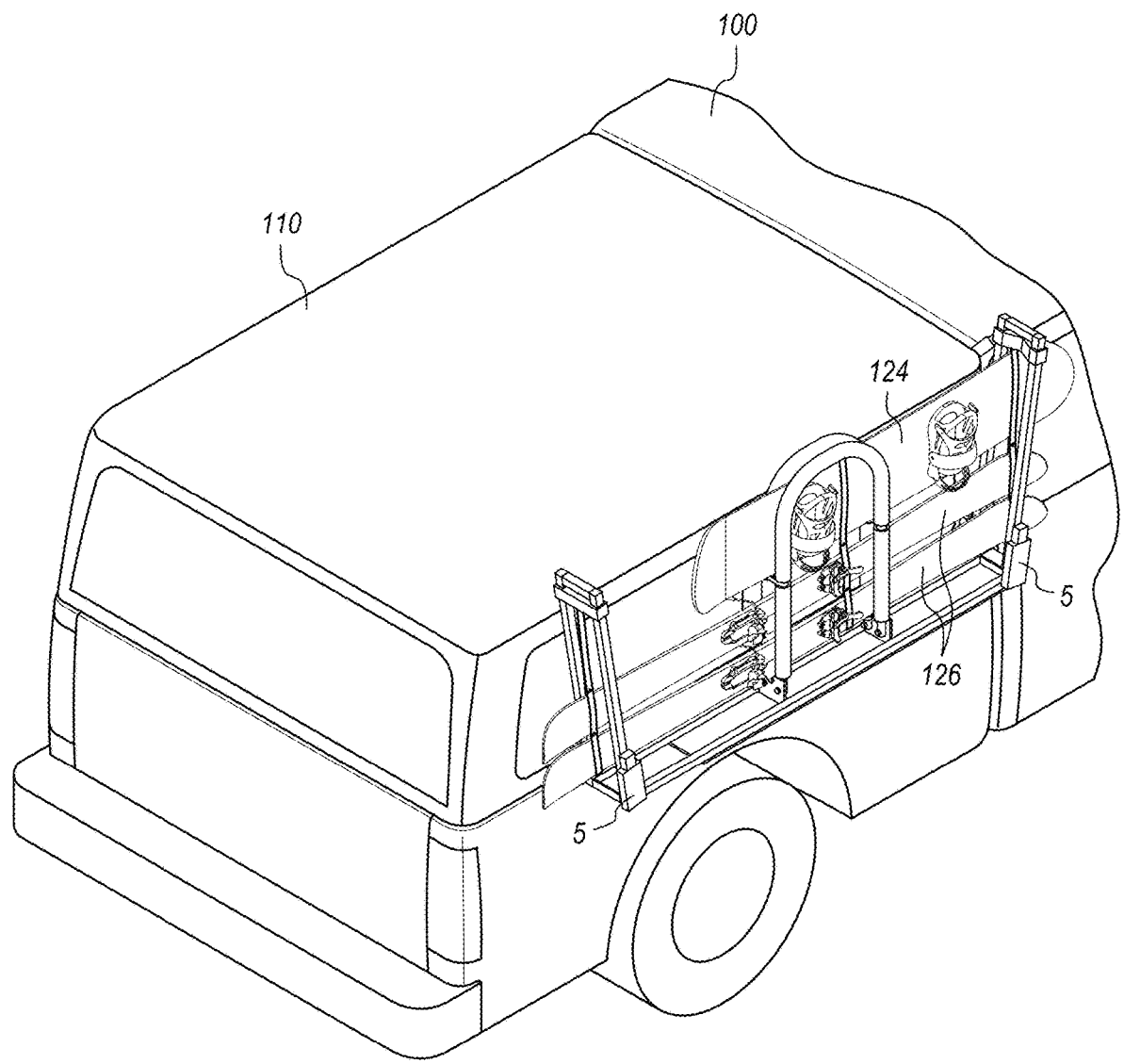
FIG. 10 is a perspective view of multi-sport rack that is reversibly attachable to a pickup truck bed with a bed shell, bed cap, or tonneau cover mounted on a pickup truck with a bed shell, bed cap, or tonneau cover, with a snow board and skis attached.
Figure 11:
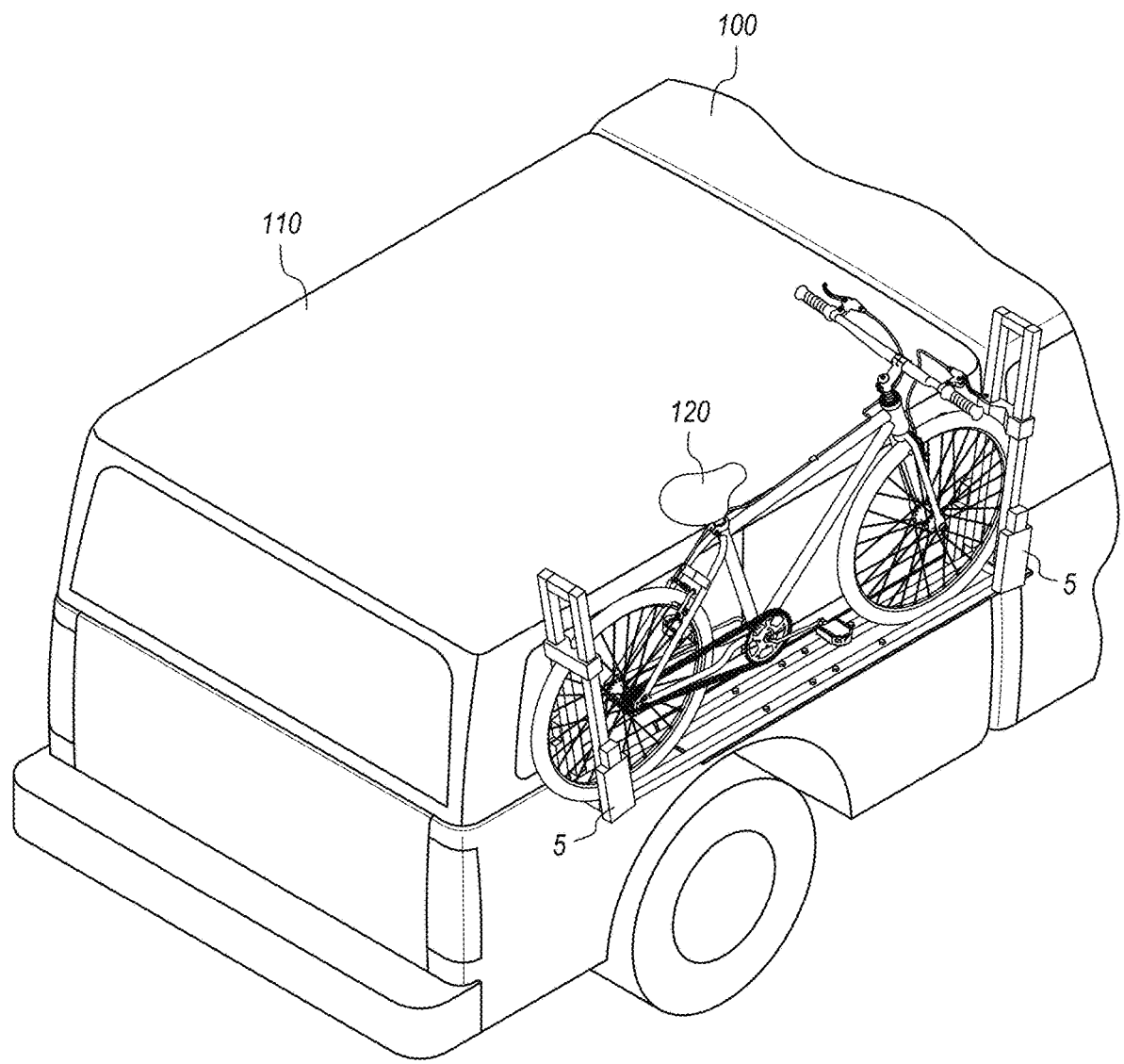
FIG. 11 is a perspective view of multi-sport rack that is reversibly attachable to a pickup truck bed with a bed shell, bed cap, or tonneau cover mounted on a pickup truck with a bed shell, bed cap, or tonneau cover, with a bicycle attached.

Multi-sport rack that is reversibly attachable to a pickup truck bed with a bed shell, bed cap, or tonneau cover 5 is reversibly attached to the bed 102 of a pickup truck 100 with a bed shell, bed cap, or tonneau cover 110 installed, which is depicted in FIGS. 10 and 11. The bed shell, bed cap, or tonneau cover 110 is installed right on top of the upper surface of top plate 12. Base plate assembly 10 and T-bracket 40 are designed to have a very low profile or low thickness but still remain sturdy and rigid. Multi-sport rack that is reversibly attachable to a pickup truck bed with a bed shell, bed cap, or tonneau cover 5 is installed to the pickup truck bed 102 first, and then the bed shell, bed cap, or tonneau cover 110 is installed right on top of multi-sport rack 5. The base plate assembly 10 and T-bracket 40 are thin enough to allow for the bed shell, bed cap, or tonneau cover 110 to be installed right on top without interfering with the bed shell, bed cap, or tonneau cover 110 in any way. The base plate assembly 10 and T-bracket 40 do not interfere with the standard clamping or attachment mechanisms of the bed shell, bed cap, or tonneau cover 110. Thus, multi-sport rack that is reversibly attachable to a pickup truck bed with a bed shell, bed cap, or tonneau cover 5 is also reversibly attached to the pickup truck bed 102 of a pickup truck 100 without a bed shell, bed cap, or tonneau cover installed, which is depicted in FIG. 6. In either case, multi-sport rack that is reversibly attachable to a pickup truck bed with a bed shell, bed cap, or tonneau cover 5 is installed onto the pickup truck bed 102 of a pickup truck 100 in the same way, as follows. First, if a bed shell, bed cap, or tonneau cover 110 is installed on the pickup truck bed 102, then the bed shell, bed cap, or tonneau cover 110 must be removed from the pickup truck bed 102. Next, the pickup truck bed 102 and bed sides should be cleaned. Then the base plate assembly 10 is positioned on one side of the pickup truck bed 102 so that the rear surface of T-bracket mounting flange 14 is placed against the outside front wall of pickup truck bed 102. The outside front wall of a pickup truck bed 102 is outside wall of the pickup truck bed 102 that is located in the crack or crevice between the truck cab and the pickup truck bed 102. The rear surface of T-bracket mounting flange 14 is placed in contact with outside front wall of pickup truck bed 102, at the top of the pickup truck bed 102, as depicted. At the same time, the outer surface of the inside wall locating flange 20 is simultaneously position against the inside side wall of the pickup truck bed 102, as depicted. At the same time, the C-shaped frame of base plate clamp bracket 30 is placed around the inside side wall of the pickup truck bed 102 so that the C-shape frame can clamp onto the inside side wall of the pickup truck bed 102, as depicted. The base plate assembly 10 is held in this position, and then the base plate clamp bracket 30 is tightened by tightening base plate clamp bracket bolt 32 to clamp onto the side wall of the pickup truck bed 102. Then the T-bracket 40 is position on top of the front wall of the pickup truck bed 102 with its longitudinal axis parallel with that of the front wall of the pickup truck bed 102 and with the base plate mounting flange 42 aligned with the T-bracket mounting flange 14 on top plate 12. Then one or more base plate mounting bolts 44 are installed into the one or more holes on base plate mounting flange 42 and the one or more holes on T-bracket mounting flange 14 by inserting the threaded ends of the one or more base plate mounting bolts 44 into these holes but without tightening the bolts at this time. Next, first T-bracket clamp 50 is inserted into the open slotted hole on first T-bracket clamp tab 46 so that first T-bracket clamp tab 46 slides in between the head of the T-bracket clamp bolt 54 and the vertical planar member of first T-bracket clamp 50. Next, second T-bracket clamp 52 is inserted into the open slotted hole of second T-bracket clamp tab 48 so that second T-bracket clamp tab 48 slides in between the head of the T-bracket clamp bolt 54 and the vertical planar member of second T-bracket clamp 52. Care must be taken to ensure that the horizontal planar members on each of first and second T-bracket clamps 50,52 are in position to catch or latch onto the outer lip of the pickup truck bed 102. Then, the T-bracket 40 is pressed firmly backwards and held to contact the front wall of the pickup truck bed 102, and then first and second T-bracket clamps 50,52 are attached by tightening the two T-bracket clamp bolts 54 to rigidly attach T-bracket clamps 50,52 and the T-bracket 40 to the pickup truck bed 102. Next, the one or more base plate mounting bolts 44 are tightened to rigidly attach the T-bracket to the base plate assembly 10. Tightening these bolts after tightening the two T-bracket clamp bolts 54 allows the T-bracket 40 exactly match or coincide with the exact angle of the pickup truck bed 102, thereby allowing for more rigid attachment to the pickup truck bed 102. Next, the lower end of diagonal strap 95 is attached to the inner end of T-bracket 40, as depicted. This attachment is accomplished with a hook on the lower end of diagonal strap 95. Then, the upper end of diagonal strap 95 is attached to the upper end of the inner stanchion on the front stanchion assembly 64, as depicted. This attachment is accomplished with a hook on the upper end of diagonal strap 95. Then the cam or ratchet on diagonal strap 95 is used to tighten and increase tension on diagonal strap 95 which greatly stiffens the whole structure of multi-sport rack 5. When installed properly, diagonal strap provides substantial rigidity to the multi-sport rack 5.

Note that multi-sport rack that is reversibly attachable to a pickup truck bed with a bed shell, bed cap, or tonneau cover 5 comes in a right-side configuration, as depicted, and also comes in a left-side configuration, which would be the exact inverse or mirror image of what is depicted. With a right-side configuration, base plate assembly 10, T-bracket 40, and diagonal strap 95 are attached to the right side of the pickup truck bed 102. With a left-side configuration, base plate assembly 10, T-bracket 40, and diagonal strap 95 are attached to the left side of the pickup truck bed 102.

A bicycle 120 is mounted to multi-sport rack 5 as follows. First, second harp member 82 is removed from second harp attachment bracket 86 and set aside. Then, first harp member 80 is removed from first harp attachment bracket 84 and set aside. First and second harp members 80,82 must be removed from multi-sport rack 5 in order to make room to attach a bicycle 120 to the multi-sport rack 5. Thus, a bicycle 120 cannot by attached to the multi-sport rack 5 along with a snow board 124, surf board, or skis 126. Next, the front stanchion assembly 64 is rotated forwards towards the front of the pickup truck 100 to the 180-degree location described above. The front stanchion assembly 64 is rotated rearwards toward the rear of the pickup truck 100 to the 180-degree location described above. Then, the bicycle 120 is placed in between the inner base rail 60 and the outer base rail 62 by placing the two bicycle tires 122 in between the inner base rail 60 and the outer base rail 62. Next, the front stanchion assembly 64 is rotated backward toward the rear of the pickup truck 100 to a point where front ratcheting tire clamp 66 is located above the front tire of the bicycle 120 and rigidly locked in this position. Then, the front ratcheting tire clamp 66 is slid downwards to firmly press downward against the front tire of the bicycle 120. Next, the rear stanchion assembly 68 is rotated forwards toward the front of the pickup truck 100 to a point where rear ratcheting tire clamp 70 is located above the rear tire of the bicycle 120 and rigidly locked in this location. Then, the rear ratcheting tire clamp 70 is slid downwards to firmly press downward against the rear tire of the bicycle 120. Thereby mounting a bicycle 120, as depicted in FIG. 11. This process is reversed in order to remove the bicycle 120 from the multi-sport rack 5.

A snow board 124, surf board, or skis 126 are mounted to the multi-sport rack as follows. First, if not already done, the first harp member 80 must be attached to the first harp attachment bracket 84 and the second harp member 82 must be attached to the second harp attachment bracket 86. Next, the second harp member 82 must be swung open and rotated downward. Then, the snow board 124, surf board, or ski 126 is threaded through the appropriate pockets of the plurality of board and ski webbings 97. Also, the snow board 124, surf board, or ski 126 must be threaded through the front stanchion assembly 64 by placing the snow board 124, surf board, or ski 126 in between the inner stanchion and outer stanchion of the front stanchion assembly 64. Also, the snow board 124, surf board, or ski 126 must be threaded through the rear stanchion assembly 68 by placing the snow board 124, surf board, or ski 126 in between the inner stanchion and outer stanchion of the rear stanchion assembly 68. Next, the second harp member 82 is swung shut and rotated upwards. Then, the first harp clamp is attached to the second harp member 82 and the second harp clamp 90 is attached to the second harp member 82 in order to clamp the second harp member 82 firmly against the snow board 124, surf board, or ski 126 thereby securely holding the snow board 124, surf board, or ski 126 to the multi-sport rack 5. Multi-sport rack that is reversibly attachable to a pickup truck bed with a bed shell, bed cap, or tonneau cover 5 can hold one surf board or one snow board 124 along with two skis 126. Alternately, multi-sport rack that is reversibly attachable to a pickup truck bed with a bed shell, bed cap, or tonneau cover 5 can hold two surf boards or two snow boards 124. Alternately, multi-sport rack that is reversibly attachable to a pickup truck bed with a bed shell, bed cap, or tonneau cover 5 can hold four skis 126. These processes are reversed in order to remove the snow board 124, surf board, or ski 126 from the multi-sport rack 5.

What is claimed is:

1. A rack for a pickup truck comprising: a base plate assembly; a base plate clamp bracket; a T-bracket; a first T-bracket clamp; a second T-bracket clamp; an inner base rail; an outer base rail; a front stanchion assembly; a front ratcheting tire clamp; a rear stanchion assembly; a rear ratcheting tire clamp, and a diagonal strap, wherein, said base plate assembly comprises: a top plate; a side plate; a bottom plate, and an inside wall locating flange, wherein, said top plate is a rigid rectangular horizontal planar member or sheet of material with a plane, a front edge, a rear edge, an outer edge, an inner edge, an upper surface, a lower surface, a thickness, a longitudinal axis, and a latitudinal axis;

said side plate is a rigid rectangular diagonal planar member or sheet of material with a plane, a front edge, a rear edge, an inner edge, an outer edge, an upper surface, a lower surface, a length, a width, a thickness, a longitudinal axis, and a latitudinal axis;

said bottom plate is a rigid planar horizontal member or sheet of material with a plane, a front edge, a rear edge, an inner edge, an outer edge, an upper surface, a lower surface, a length, a width, a length, a thickness, a longitudinal axis, and a latitudinal axis;

said longitudinal axis of said top plate, said longitudinal axis of said side plate, and said longitudinal axis of said bottom plate are parallel;

said plane of said top plate is parallel with said plane of said bottom plate;

said outer edge of said top plate is joined with or rigidly attached to said inner edge of said side plate;

said plane of said top plate meets said plane of said side plate at an angle that is greater than 180 degrees and less than 270 degrees;

said lower surface of said top plate and said lower surface of said side plate form an angle less than 180 degrees;

said upper surface of said top plate and said upper surface of said side plate form an angle greater than 180 degrees;

said outer edge of said side plate is joined with or rigidly attached to said inner edge of said bottom plate;

said front edge of said top plate is aligned with and even with said front edge of said side plate and said front edge of said bottom plate;
said rear edge of said top plate is aligned with and even with said rear edge of said side plate and said rear edge of said bottom plate;
said inside wall locating flange has a tab, flap, or projection that extends perpendicularly downward from said lower surface of said top plate; wherein,
said tab, flap, or projection has: a length, a width, a thickness, an inner surface, an outer surface, a front edge, a rear edge, an upper edge, a lower edge, a longitudinal axis, and a plane;
said tab, flap, or projection is rigidly attached to said lower surface of said top plate, adjacent to said front edge of said top plate;
said longitudinal axis of said tab, flap, or projection is parallel with said inner edge of said top plate; and
said plane of said tab, flap, or projection is perpendicular to said plane of said top plate;
said top plate further comprises: a T-bracket mounting flange and one or more base plate clamp bracket mounting holes, wherein,
said T-bracket mounting flange is a rectangular or square extension or ear projecting downward from said front edge of said top plate;
said T-bracket mounting flange is located on said front edge of said top plate adjacent to said inner edge of said top plate;
said T-bracket mounting flange has an upper edge, a lower edge, an inner edge, an outer edge, a front surface, a rear surface, a length, a width, a thickness, and one or more mounting holes;
said upper edge of said T-bracket mounting flange is rigidly attached to said front edge of said top plate to form a right angle there between; and
each said one or more base plate clamp bracket mounting holes is a circular hole or slotted hole through said top plate;
said base plate clamp bracket has a rigid C-shaped frame with an upper end and a lower end wherein said lower end of said rigid C-shaped frame is fitted with a base plate clamp bracket bolt;
said base plate clamp bracket is rigidly attached to said top plate;
said T-bracket has a rigid horizontal planar member with a length, a width, a height, a longitudinal axis, an inside end, an outside end, an upper surface, a lower surface, a front surface, and a rear surface and a rigid vertical planar member with a length, a width, a height, a longitudinal axis, an inside end, an outside end, an upper surface, a lower surface, a front surface, and a rear surface, wherein,
said upper edge of said rigid vertical planar member is rigidly connected to said front edge of said rigid horizontal planar member at a ninety-degree angle;
said rigid vertical planar member has a base plate mounting flange that is a rectangular or square tab or extension of said vertical planar member extending beyond said outside edge of said horizontal planar member with one or more mounting holes therein;
said base plate mounting flange on said T-bracket is reversibly rigidly attachable to said T-bracket mounting flange on said top plate;
said T-bracket further comprises a first T-bracket clamp tab that is a rigid horizontal planar member with: a length, a width, an upper surface, a lower surface, an inside edge, an outside edge, a front edge, and a rear edge, wherein,
said lower surface of said first T-bracket clamp tab is rigidly attached to said upper surface of said T-bracket;
said first T-bracket clamp tab has an open slotted hole that breaks through said outside edge of said first T-bracket clamp tab; and
said open slotted hole has a longitudinal axis that is parallel with said longitudinal axis of said T-bracket;
said T-bracket further comprises a second T-bracket clamp tab that is a rigid horizontal planar member with: a length, a width, an upper surface, a lower surface, an inside edge, an outside edge, a front edge, and a rear edge, wherein,
said lower surface of said second T-bracket clamp tab is rigidly attached to said upper surface of said T-bracket;
said second T-bracket clamp tab has an open slotted hole that breaks through said outside edge of said second T-bracket clamp tab; and
said open slotted hole has a longitudinal axis that is parallel with said longitudinal axis of said T-bracket;
said first T-bracket clamp has a horizontal planar member with a length, a width, a height, a longitudinal axis, an inside end, an outside end, a first upper surface, a second upper surface, a lower surface, a front surface, a first rear surface, and a rear surface, and a vertical planar member with a length, a width, a height, a longitudinal axis, an inside end, an outside end, a first upper surface, a second upper surface, a lower surface, a front surface, a first rear surface, and a rear surface, wherein,
said lower edge of said vertical planar member is rigidly connected to said front edge of said horizontal planar member at a ninety-degree angle;
said vertical planar member has a female tapped or threaded hole that engages with and is fitted with a T-bracket clamp bolt; and
said first T-bracket clamp is reversibly rigidly attachable to said first T-bracket clamp tab;
said second T-bracket clamp has a horizontal planar member with a length, a width, a height, a longitudinal axis, an inside end, an outside end, a first upper surface, a second upper surface, a lower surface, a front surface, a first rear surface, and a rear surface, and a vertical planar member with a length, a width, a height, a longitudinal axis, an inside end, an outside end, a first upper surface, a second upper surface, a lower surface, a front surface, a first rear surface, and a rear surface, wherein,
said lower edge of said vertical planar member is rigidly connected to said front edge of said horizontal planar member at a ninety-degree angle;
said vertical planar member has a female tapped or threaded hole that engages with and is fitted with a T-bracket clamp bolt; and
said second T-bracket clamp is reversibly rigidly attachable to said second T-bracket clamp tab;
said inner base rail is a rigid horizontal structural member, said inner base rail has a length, a width, a height, an upper surface, a lower surface, an inner surface, an outer surface, a front end, a rear end, and a longitudinal axis, said outer base rail is a rigid horizontal structural member, said outer base rail has a length, a width, a height, an upper surface, a lower surface, an inner surface, an outer surface, a front end, a rear end, and a longitudinal axis, said lower surface of said inner base rail is rigidly attached to said upper surface of said top plate so said longitudinal axis of said inner base rail is parallel with said longitudinal axis of said top plate, said lower surface of said outer base rail is rigidly attached to said upper surface of said top plate so that said longitudinal axis of said outer base rail is parallel with said longitudinal axis of said top plate and said longitudinal axis of said inner base rail, said front end of said inner base rail is aligned with and even with said front end of said outer base rail, said rear end of said inner base rail is aligned with and even with said rear end of said outer base rail, said front stanchion assembly comprises: an inner stanchion and an outer stanchion, wherein, said inner stanchion on said front stanchion assembly is a rigid upright structural member with a length, a width, a height, an upper end, a lower end, an inner surface, an outer surface, a front surface, a rear surface, and a longitudinal axis, said outer stanchion on said front stanchion assembly is a rigid upright structural member with a length, a width, a height, an upper end, a lower end, an inner surface, an outer surface, a front surface, a rear surface, and a longitudinal axis, said outer surface of said lower end of said inner stanchion on said front stanchion assembly is pivotally attached to said inner surface of said front end of said inner base rail, said inner surface of said lower end of said outer stanchion on said front stanchion assembly is pivotally attached to said outer surface of said front end of said outer base rail, and said outer surface of said upper end of said inner stanchion on said front stanchion assembly is rigidly attached to said inner surface of said upper end of said outer stanchion on said front stanchion assembly so that said upper end of inner stanchion on said front stanchion assembly is even with and aligned with said upper end of said outer stanchion on said front stanchion assembly and said longitudinal axis of said inner stanchion and said longitudinal axis of said outer stanchion on said front stanchion assembly are parallel, wherein a structural member has a first end rigidly attached to said outer surface of said upper end of said inner stanchion on said front stanchion assembly and a second end rigidly attached to said inner surface of said upper end of said outer stanchion on said front stanchion assembly, said front ratcheting tire clamp is a rigid horizontal structural member that is slidably attached to said inner and said outer stanchions on said front stanchion assembly, wherein, said slidable attachment is such that said front ratcheting tire clamp remains perpendicular to said inner and said outer stanchions on said front stanchion assembly, and said slidable attachment is biased or ratcheted in that said front ratcheting tire clamp freely slides downwards but is restricted from upward movement without first releasing a ratchet catch, said rear stanchion assembly comprises: an inner stanchion and an outer stanchion, wherein, said inner stanchion on said rear stanchion assembly is a rigid upright structural member with a length, a width, a height, an upper end, a lower end, an inner surface, an outer surface, a front surface, a rear surface, and a longitudinal axis, said outer stanchion on said rear stanchion assembly is a rigid upright structural member with a length, a width, a height, an upper end, a lower end, an inner surface, an outer surface, a front surface, a rear surface, and a longitudinal axis, said outer surface of said lower end of said inner stanchion on said rear stanchion assembly is pivotally attached to said inner surface of said front end of said inner base rail, said inner surface of said lower end of said outer stanchion on said rear stanchion assembly is pivotally attached to said outer surface of said front end of said outer base rail, and said outer surface of said upper end of said inner stanchion on said rear stanchion assembly is rigidly attached to said inner surface of said upper end of said outer stanchion on said rear stanchion assembly so that said upper end of inner stanchion on said rear stanchion assembly is even with and aligned with said upper end of said outer stanchion on said rear stanchion assembly and said longitudinal axis of said inner stanchion and said longitudinal axis of said outer stanchion on said rear stanchion assembly are parallel, wherein a structural member has a first end rigidly attached to said outer surface of said upper end of said inner stanchion on said rear stanchion assembly and a second end rigidly attached to said inner surface of said upper end of said outer stanchion on said rear stanchion assembly, said rear ratcheting tire clamp is a rigid horizontal structural member that is slidably attached to said inner and said outer stanchions on said rear stanchion assembly, wherein, said slidable attachment is such that said rear ratcheting tire clamp remains perpendicular to said inner and said outer stanchions on said rear stanchion assembly, and said slidable attachment is biased or ratcheted in that said rear ratcheting tire clamp freely slides downwards but is restricted from upward movement without first releasing a ratchet catch;

said diagonal strap is a strip or ribbon of high strength flexible material with an upper end, an upper hook, a lower end, a lower hook, and a ratchet or cam mechanism, wherein, said lower hook is attached to said inner end of said T-bracket; and said upper hook is attached to said upper end of said inner stanchion on said front stanchion assembly.

2. A rack for a pickup truck as recited in claim 1 further comprising: a first harp member 80; a second harp member 82; a first harp attachment bracket 84; a second harp attachment bracket 86; a first harp clamp 88; a second harp clamp 90, and a plurality of board and ski webbings, wherein, said first harp member is a length of rigid material formed into a bow shape or a harp shape;

said first harp member has a first end, a first ninety-degree bend, a second ninety-degree bend, a second end, and a longitudinal axis;

said second harp member is a length of rigid material formed into a bow shape or a harp shape;

said second harp member has a first end, a first ninety-degree bend, a second ninety-degree bend, a second end, and a longitudinal axis;

said first harp attachment bracket has a rigid vertical planar member with an upper edge, a lower edge, an inner edge, an outer edge, a front surface and a rear surface;

said lower edge of said first harp attachment bracket is rigidly attached to said upper surface of said bottom plate adjacent to said front edge of said bottom plate so that said vertical planar member of said first harp attachment bracket is perpendicular to said plane of said bottom plate;

said second harp attachment bracket has a rigid vertical planar member with an upper edge, a lower edge, an inner edge, an outer edge, a front surface and a rear surface;

said lower edge of said second harp attachment bracket is rigidly attached to said upper surface of said bottom plate adjacent to said front edge of said bottom plate so that said vertical planar member of said second harp attachment bracket is perpendicular to said plane of said bottom plate;

said first end of said first harp member is reversibly rigidly attached to said first harp attachment bracket;

said second end of said first harp member is reversibly rigidly attached to said second harp attachment bracket;

said first end of said second harp member is reversibly pivotally attached to said first harp attachment bracket;

said second end of said second harp member is reversibly pivotally attached to said second harp attachment bracket;

said first harp clamp is a rigid C-shaped member;

said first harp clamp is pivotally attached to said first harp member;

said first harp clamp is reversibly attachable to said second harp member;

said second harp clamp is a rigid C-shaped member;

said second harp clamp is pivotally attached to said first harp member;

said second harp clamp is reversibly attachable to said second harp member;

each of said plurality of board and ski webbings is two lengths, strips, or ribbons of high strength flexible material that are stacked together and then stitched together or attached together;

each of said plurality of board and ski webbings has an upper end that is attached to said first harp member, said front stanchion assembly, or said rear stanchion assembly; and each of said plurality of board and ski webbings has a lower end that is attached to said first harp member, said front stanchion assembly, or said rear stanchion assembly.

* * * * *